United States Patent Office 3,459,951
Patented Aug. 5, 1969

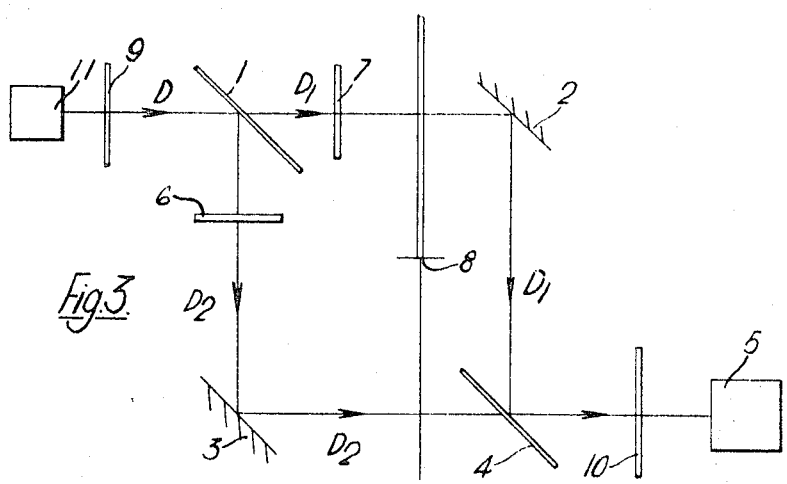
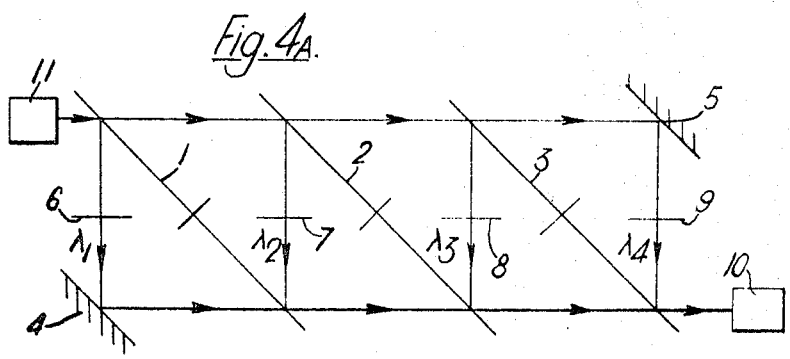
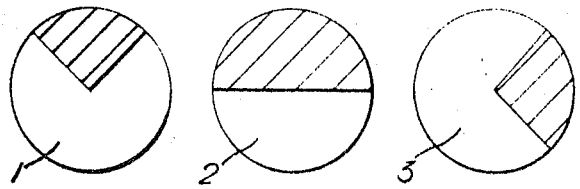

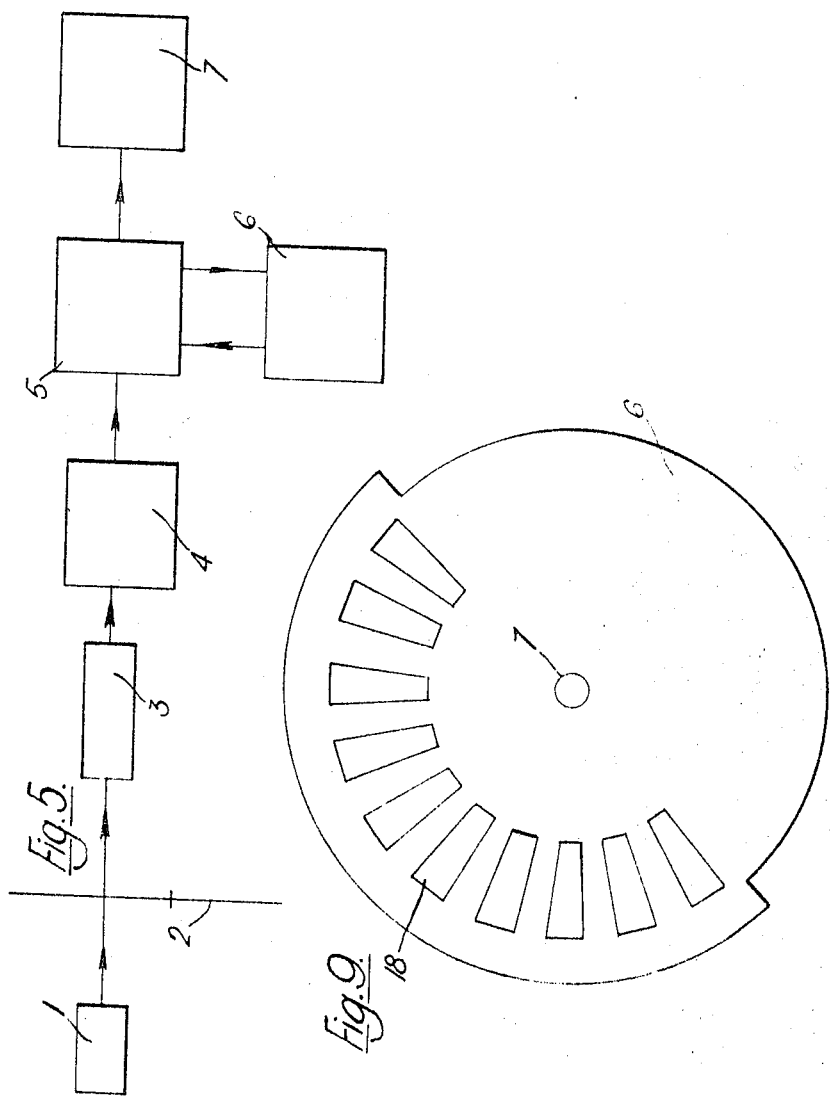

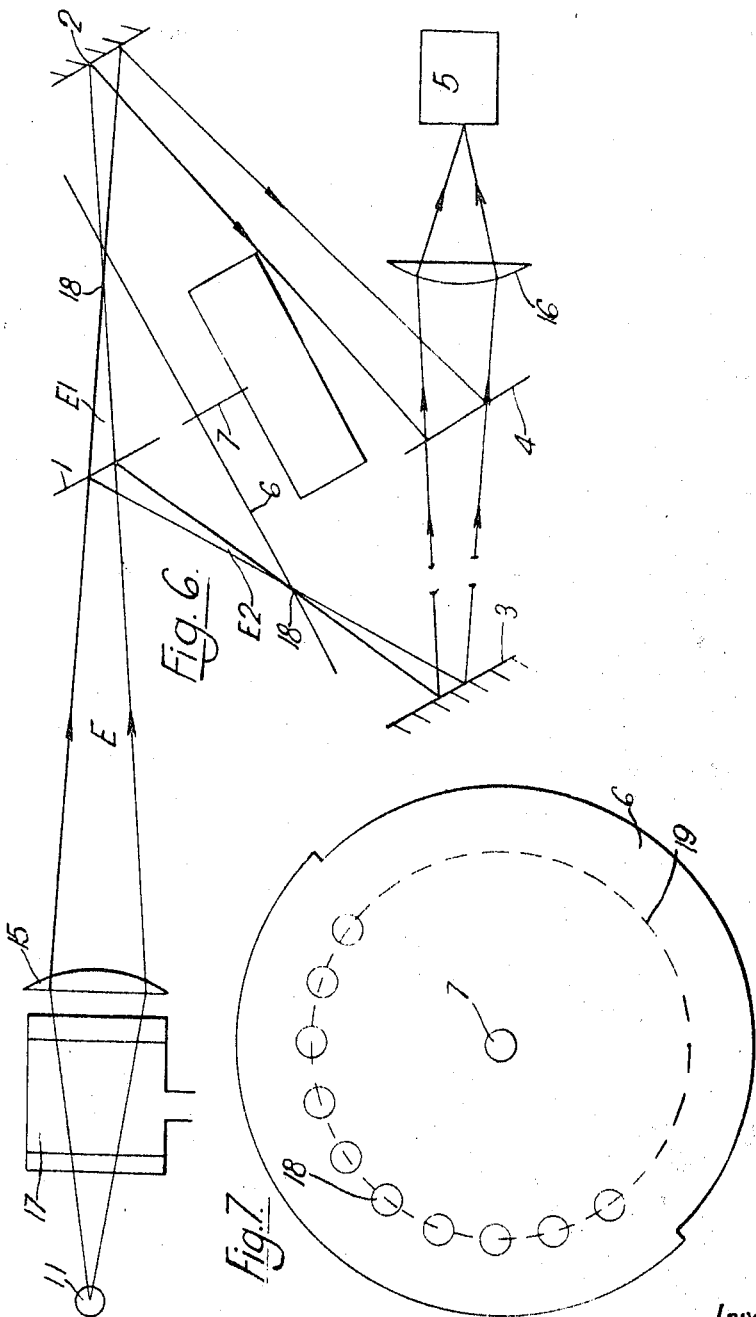

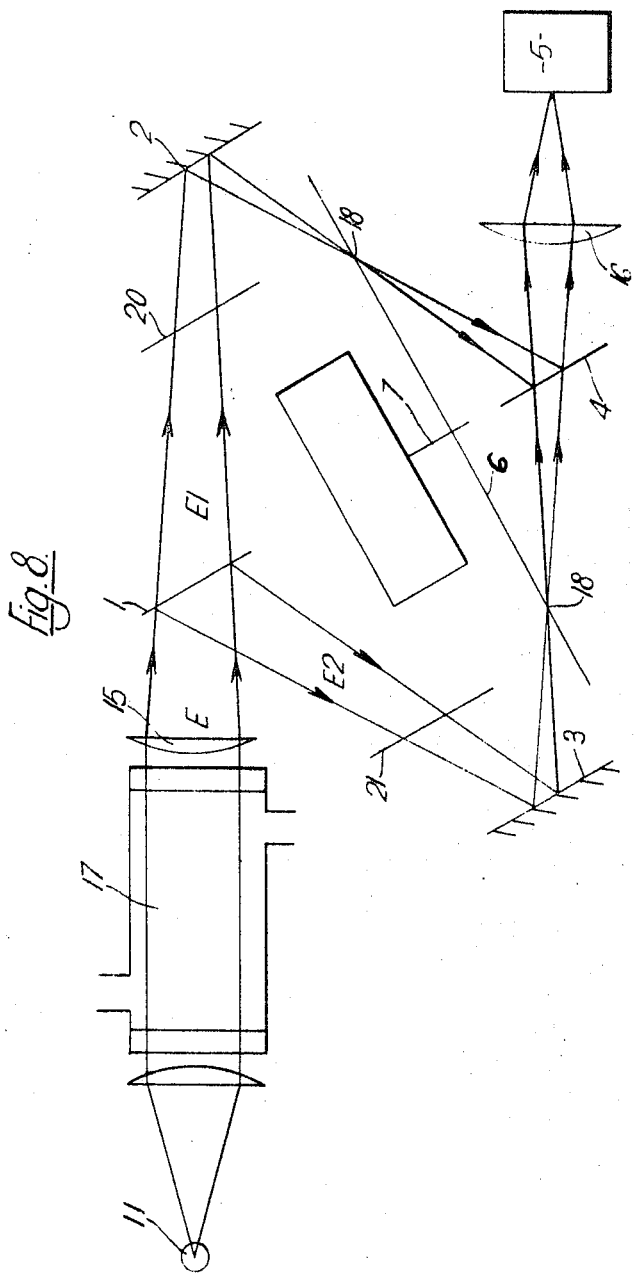

3,459,951
PHOTOMETRIC ANALYZER FOR COMPARING ABSORPTION OF WAVELENGTH OF MAXIMUM ABSORPTION WITH WAVELENGTH OF MINIMUM ABSORPTION
John Joseph Howarth and Harold Meredith Stanier, Runcorn, England, assignors to Imperial Chemical Industries Limited, London, England, a corporation of Great Britain
Filed Sept. 15, 1965, Ser. No. 487,445
Claims priority, application Great Britain, Sept. 15, 1964, 37,623/64; May 17, 1965, 20,734/65
Int. Cl. H01j 5/16; G01d 5/36; G01j 3/48
U.S. Cl. 250—226                                         7 Claims

ABSTRACT OF THE DISCLOSURE

There is provided a photometric analyzer wherein radiation from a single source traverses a single optical path through a single absorption cell which is adapted to contain the sample to be analyzed and is received by a single detector. The radiation from the single source is divided into two beams, each of which traverse different preselected wavelengths by passing through appropriate filters. After acquiring the different wavelengths the two beams are combined and passed along a single optical path through the sample to be analyzed. A shutter causes the two beams to be alternately received by the detector.

---

Figure 1A:
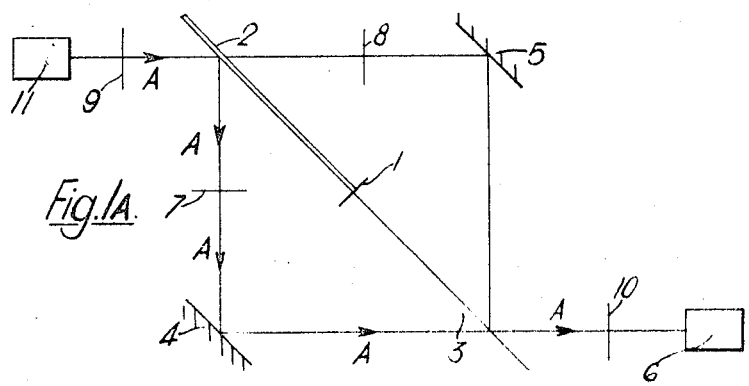

This invention relates to an analytical device, and more particularly to a photometric analyser which is useful for the analysis of materials by their absorption spectra.

It is well known to analyse substances by measurement of their capacity for absorbing radiation of a wavelength characteristic of the substance sought. In carrying out this procedure, however, many difficulties can arise which affect its accuracy or reliability. In particular, changes due to soiling of the cell containing the sample under analysis, and variations in the radiation source and radiation detector are particularly troublesome.

To overcome these difficulties it has been proposed to measure the absorption of radiation at two wavelengths, one corresponding to an absorption maximum and the other to an absorption minimum for the substance sought, and to compare these. In its simplest form, this technique uses two beams of radiation which pass through the sample and through appropriate filters, and then are measured by two detectors or some form of differential analyser. Attempts have been made to improve the device and especially to simplify it so that it uses only one source, a single optical path through the sample being analysed, and only one detector, but these have not been entirely satisfactory in providing an apparatus which combines sensitivity with reliability of operation. In particular, it has been proposed to use rotating or oscillating filters, so that radiation of different wavelengths follows essentially the same optical path, but this is not entirely satisfactory owing to the fragile nature of the filter and unwanted modulation of the beam.

According to the present invention we provide an improved photometric analyser in which radiation from a single source traverses a single optical path through an absorption cell adapted to contain the sample to be analysed and is received by a single detector, wherein the beam of radiation is divided so that radiation of two different wavelengths is made to traverse different optical paths which are finally brought together in such a way that the two wavelengths are received alternately by a single detector.

By this arrangement, we find that we are able to avoid the difficulties arising from movement of filters, and by keeping the filters stationary we can simplify the construction and maintenance of the analyser. The filters can also be tuned easily to a precise wavelength by tilting.

The invention may be applied to the use of any electromagnetic radiation, including wavelengths in the visible, ultra-violet or infra-red (as may be appropriate to the absorption characteristics of the substance under examination. The source of radiation and the detector used can be any of these well known in the art and may be of a design and construction in themselves well known.

It is preferred that the two different optical paths taken by the different wavelengths should be as near equal as possible so as to minimise errors which can arise due to unbalance in the beams outside the sample cell. The arrangement for diverting the radiation beam so as to produce the different optical paths and to recombine them again may be situated between the radiation source and the sample cell or between the sample cell and the detector, as may be more convenient.

The filters to be used for the separation of the radiation according to its wavelength may be of any known form of construction. For obtaining a separation of the two wavelengths to be relied upon in the analysis, we prefer to use interference or "Fabry-Perot" filters (which are of multi-layer construction) since these can be made very readily to pass radiation of very narrowly defined band of wavelength and of any selected wavelength. Auxiliary filters may also be used in addition to these primary filters, particularly for filtering the beam as a whole before or after the region where the optical paths differ, in order to remove unwanted radiation over most of the spectrum while allowing a conveniently limited band to pass in that part of the spectrum to be used for the analysis.

Interruption of the radiation beam and splitting of the beam so as to provide for different optical paths can be achieved by a simple mechanical device adapted to move in the optical path of the beam so as to interrupt or divert it. Suitable mechanical devices include rotating or oscillating shutter and reflectors, which may in some circumstances be combined into a single device. Power for such a device can be provided by a suitable motor, which is preferably a synchronous one so as to provide a definite frequency of interruption. The main beam may also be modulated or interrupted in known manner, so as to facilitate detection and accuracy of analysis.

In one form of construction according to our invention, a beam of radiation passing through the absorption cell containing the sample under examination is split into two beams by a rotating or oscillating mirror. The resulting two beams of radiation are then filtered by placing in their path appropriate filters which allow the selected wavelengths to pass. The two beams, which may be deflected as necessary by known means, for example using reflection or refraction by mirrors and/or prisms, are then recombined by a similar moving mirror so that the optical paths of the two beams are made substantially coincident where they are received by the detector. The two moving mirrors can be combined or linked together, and a particularly suitable arrangement is that in which a rotary shutter having reflecting surfaces on both sides is used to effect both diversion, interruption, and recombination of the beam.

Figure 1B:
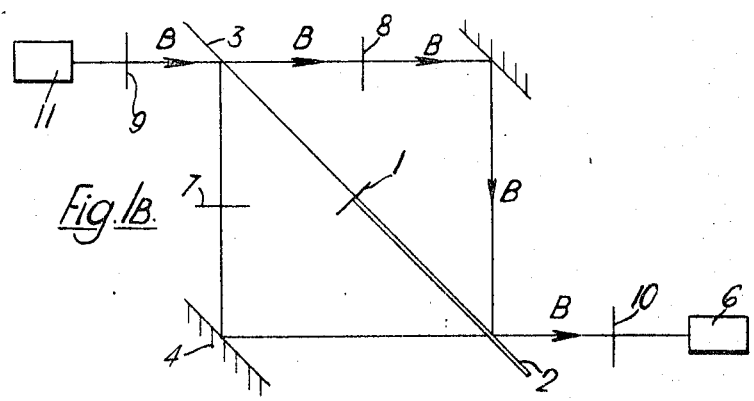

This form of our invention is illustrated with reference to the attached FIGURE 1 which is a diagrammatic representation of an optical system in which a beam of radiation from a source 11 is made to impinge on a disc adapted to rotate about an axis 1 and comprised over half its surface 2 of a double silvered mirror surface, and over the remaining half of its surface 3 to have an aperture therein where the radiation beam impinges upon it, or to be made of a material which is transparent. Radiation striking the rotating mirror is made to follow the path A while radiation meeting the aperture or transparent pocket of the disc follows path B. Radiation following these two paths is reflected from mirrors 4 and 5 respectively so that radiation following path A passes through the aperture or transparent section of the disc to pass directly to detector 6, while radiation passing by path B is reflected from the mirror section of the disc towards detector 6. Filters 7 and 8 respectively are positioned so that radiation passing along paths A, B respectively pass through them. Auxiliary filters 9 and 10 may also be placed if desired in the path of the beam of radiation, to provide sufficient filtering to remove radiation of wavelength which is not required for the determination. FIGURES 1A and 1B show the alternative positions of the disc.

An alternative form of construction which avoids the use of a rotating mirror, and can rely upon a simple rotating shutter (sometimes described as an interruptor or chopper), is one in which the filtering and splitting of the beam is achieved simultaneously by use of interference filters, which have the property of transmitting one wavelength while reflecting others. By suitably positioning two such filters, together with two mirrors, the beam can be divided so that radiation of one selected wavelength takes one path and light of another selected wavelength takes a substantially parallel path, and a simple rotating shutter device can then be positioned so as to interrupt the two beams in turn.

Figure 2:
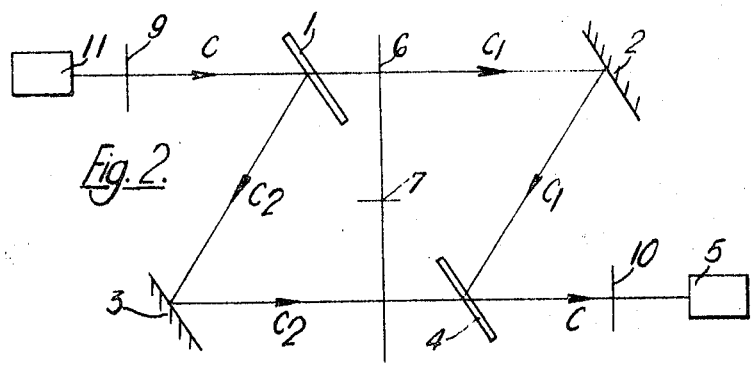

This embodiment is illustrated in FIGURE 2, wherein radiation following the path C is made to impinge upon an inclined face of an interference filter 1 so that radiation of one wavelength passes through (optical path C1) and the remainder of the radiation is reflected from the surface along a second path (path C2). The resulting two beams are then reflected by mirrors 2 and 3 respectively so that radiation following path C1 is made to impinge upon the inclined surface of a second dielectric filter 4, which is transparent to the second wavelength but not to the first, so that radiation following path C1 is reflected, while from the radiation following path C2 a second selected wavelength is transmitted thereby. By suitable disposition of the planes of the filters and the mirrors, the emergent beam can be made to consist of radiation of the two selected wavelengths, following substantially coincident optical paths from filter 4 towards detector 5. Interruption of the two beams on paths C1 and C2 can be achieved by positioning a rotating shutter device 6, rotating about an axis 7, so as to interrupt alternately paths C1 and C2. Auxiliary filters can be positioned at 9 and 10, as for the device of FIGURE 1, so as to remove radiation of wavelengths not required for the determination.

Another alternative is to use half-silvered or multilayer mirrors or a transparent material of suitably high refractive index (e.g., germanium or silicon) to split and recombine the beams.

This is illustrated in FIGURE 3 wherein radiation following the path D impinges on the inclined face of the beam splitter 1 (conveniently a multi-layer mirror). Part of the radiation passes along the path D1 and part along D2. Full mirrors 2 and 3 reflect the radiation through the rotary shutter 8 onto the beam combiner 4 (also conveniently a multi-layer mirror) after which the radiation passes to the detector 5. Auxiliary filters 9 and/or 10 select the required transmission band while filters 6 and 7 select the specific wavelength corresponding to a maximum and a minimum absorption for the compound to be measured. The filters 6 and 7 may well be of the high-order Fabry-Perot type, designed to produce a multiplicity of bands coincident and anticoincident with the fine structure absorption spectrum of the compound to be measured, in which case a maximum of selectivity is achieved and, as a result, the minimum inference from compounds having absorption spectra in a waveband overlapping that of the compound being estimated.

The general arrangement of our apparatus is shown schematically in FIGURE 5. This consists of a radiation source 1, a high frequency modulator 2 (operating at a frequency which is conveniently 800 cycles per second but may be chosen to suit the detector), a sample cell 3 which may consist of either two windows in a plant pipe or vessel or one such window with a suitably placed mirror (an attenuated total reflection cell), followed by a beam analyser and a detector unit 4 described above. The photo-electrode detector signal is amplified and detected to remove the high frequency modulation by the variable gain amplifier and detector unit 5. The output from this detector is compared with a standard reference 6 and the gain of the amplifier adjusted if necessary to restore the signal to a preselected value. The low frequency output signal amplitude after the variable gain amplifier/detector is then proportional to only the percentage of absorption of the radiation due to the compound to be analysed and not to such factors as window fouling, source intensity, detector efficiency, and the like. Because of this comparison circuit there is no need for a ratio recorder, and the receiver 7 can therefore be a standard millivolt or milliampere recorder.

When the beam of radiation is modulated by a high frequency modulator (usually a rotary chopper or shutter device) (item 2 FIGURE 5) and then the modulated beam is again interrupted in the main part of the apparatus by a second rotating shutter as described above, there is often a tendency for interaction of these to produce a "beat" frequency or random modulation which appears in the signal from the detector and may complicate or interfere with the final measurement stage. This effect may arise from the motors either being not completely synchronous or tending to hunt about the mean synchronous position.

This difficulty can be overcome by using a rotating disc shutter which is provided with a series of regularly spaced apertures disposed so as to interrupt the beam of radiation for part of the cycle of rotation of the disc. Use of this form of disc provides both high frequency and low frequency modulation of the beam, obviates the need for a separate main beam modulator, and eliminates the risk of unwanted modulations or beat frequencies being produced.

It is also very helpful if means are provided for focussing the beam at or near the point through which the apertures move during rotation of the disc. This increases the amount of radiation which can be passed through the apertures and thus increases the sensitivity of the apparatus by producing a well-defined signal. Focussing may be achieved by any conventional means, for example a lens, mirror, zone plate, or a combination of these.

The size and distribution of the apertures in the disc should be such as to ensure that the change-over from one wavelength to another at the detector is as clean as possible. Several factors affect this, and the final form of the disc may have to be a compromise if factors conflict.

When the two wavelength are of equal intensity there is no evidence in the detector signal that the change-over has taken place; this will produce the best low-frequency signal, and avoid quadrature signals in the low-frequency which may impair the ultimate limit of detection. There should be no positions of the disc which allow both wavelengths to be received by the detector, and the number of positions which cause neither wavelength to be passed should be kept to a minimum. Preferably the apertures are disposed around about half of a circular path around the axis of rotation of the disc, as this gives a statisfactory ratio between the signals received by the detector and ensures a good change-over.

The apertures may be of any convenient shape, for example round or square, wedge-shaped, or slots or louvres, but are preferable in the form of a wedge having opposite sides formed by lines which are radial with respect to the axis of rotation of the disc. The apertures should be as large as possible so as to contain fully the radiation image and allow the maximum radiation to pass; especially, they should be at least as large as the cross-sectional area of the optical path in the plane of the shutter. The ratio between the width of the apertures and the web between them is preferably about 1:1 as this produces the best high-frequency waveform.

It is preferred that the apertures are close to the periphery of the disc, as this facilitates making the apertures large while keeping the disc's size and weight low. Low weight and size, together with dynamic balancing (e.g. by providing an extended rim where the apertures occur) help to preserve the motor and its bearings.

The apertures in the disc may be holes or panels of material transparent to the radiation used.

It is very desirable for the two beams to be made as coincident as possible for receipt by the detector, and the better the accuracy of recombination the better is the ultimate limit of accuracy of the apparatus.

Laboratory experience has shown that the alignment of the optical system is very critical if greatest accuracy is required. The sensitivity of the photocell surface is usually non-uniform and tends to vary unevenly with time and temperature, and these inherent defects of the photocell can cause the readings of the instrument to drift unless the two beams of radiation are recombined with sufficient accuracy to make them impinge on exactly the same portion of the photosensitive area of the cell. These effects caused by the cell can be reduced by an arrangement which spreads the images of the beams so that they cover substantially all the sensitive cell surface. This may be done by adjustment of focussing or by focussing the beam on to a diffusing device (e.g. a diffusing disc or plate, or a diffusing tube) so that the radiation is made to cover the cell surface evenly. To ensure even coverage, it is convenient to spread the beam sufficiently to make it produce an area of illumination which is slightly larger than the photocell's sensitive area.

In the embodiment illustrated in FIGURE 6, radiation following the path E from a source 11, after passing through cell 17 containing the sample under examination, is made to impinge upon an inclined face of an interference filter 1 so that radiation of one wavelength passes through (optical path E1) and radiation of another wavelength is reflected from the surface by a second path (path E2). The resulting two beams are then reflected by mirrors (2) and (3) respectively so that radiation following path E1 is made to impinge upon the inclined surface of a second dielectric filter 4, which is transparent to the second wavelength but not to the first, so that radiation following path E1 is reflected, while radiation following path E2 is transmitted thereby. By suitable disposition of the planes of the filters and the mirrors, the emergent beam can be made to consist of radiation of the two selected wavelengths, following substantially concident optical paths from filter 4 towards detector unit 5. The beam, after it passes through filter 1, is focussed by a lens 15 on the surface, at 18, of a rotating shutter device 6, rotating about an axis 7 and positioned so as to interrupt alternately the paths E1 and E2. A second lens 16 may be provided to concentrate the emergent beam on to the detector 5. The form of the disc 6 is shown in more detail in FIGURE 7, wherein the series of equidistantly spaced holes 18 is disposed along a circular path 19 around the axis of rotation 7. The unit 5 may combine detection, amplification and display, as desired.

FIGURE 8 represents an alternative embodiment in which the beam-splitting filters 1 and 4 of FIGURE 6 are replaced by beam-splitting or semi-reflecting devices, e.g. half-silvered or dielectric mirrors or thin slices of a suitable material having a high reflection coefficient, such as silicon or germanium. In this form of construction, suitable filters 20 and 21 (most appropriately the same filters described above for use as items 1 and 4) need to be inserted in the two optical paths E1 and E2; if desired, their transmission bands can be adjusted or varied appropriately by conventional means, particularly by tilting relative to the optical path concerned.

FIGURE 9 illustrates an alternative form of disc, having wedge-shaped apertures.

A speed of rotation of the disc is usually selected so that signals of convenient frequency are generated in the detector. To secure a good separation of the high and low frequencies, it is preferred to use a disc containing not less than five apertures, and 8 to 12 are usually most suitable.

In all forms of our invention, it is advantageous to incorporate a device which produces a phase reference signal locked to the low-frequency signal of the detector. By using this reference signal to control a phase-sensitive detector fed with the signal of the main detector in the analytical circuit, it is possible to reduce the bandwidth and hence the noise level of the system, with consequent improvement of the detection efficiency. This can be achieved by an arrangement in which the said auxiliary lamp and photocell are held on opposite sides of the rotating shutter disc and the disc is shaped so that it provides a barrier or obstruction between lamp and photocell for part (conveniently about half) of the period of rotation of the disc.

Figure 10:
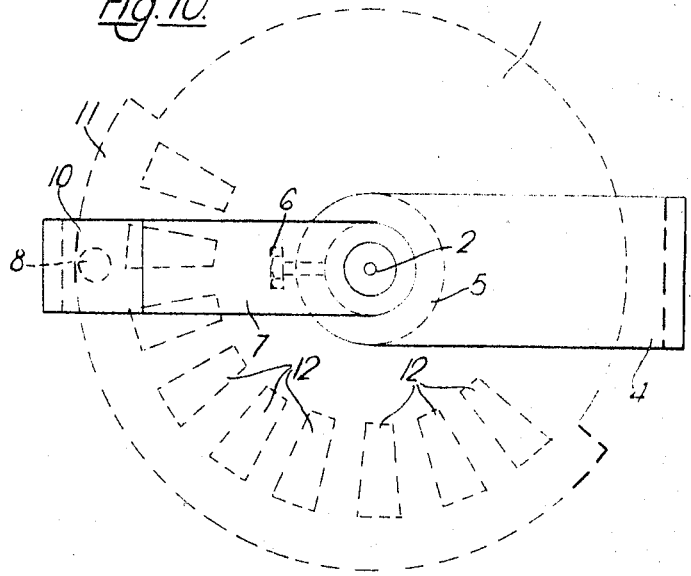
Figure 11:
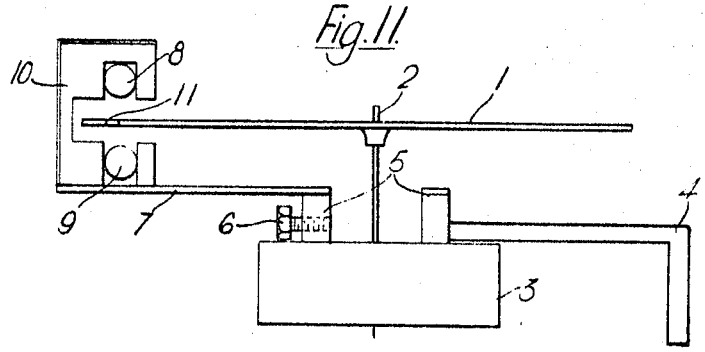

FIGURES 10 and 11 represent views in plan and vertical section respectively of a form of construction for the auxiliary lamp/photocell combination. In the plan view the apparatus is viewed from above, with the disc removed so as not to obscure the main parts of the device. The position of the disc is indicated in broken lines.

The rotatable disc shutter 1 is mounted on the shaft 2 of a synchronous motor 3. The motor is mounted by way of its casing on a bracket 4, and is provided with a collar or sleeve 5 which is rotatable around the shaft 2 but is independent of it and is secured in any desired position by a set-screw 6 in the mounting bracket 4. To this collar 5 is attached a radial arm 7 carrying a photocell 8 and a lamp 9 mounted in a housing 10 which supports the lamp and photocell on opposite sides of the extended rim portion 11 forming part of the periphery of the disc. This rim 11 is present around that portion of the disc in which the apertures 12 are provided but not around the portion of the disc free from apertures. The lamp and photocell may be such as to operate at any convenient wavelength, whether in the visible or the invisible part of the spectrum, and they must be positioned so that the apertures in the disc do not pass between them and they are well clear of the optical path of radiation which has passed through the sample cell.

In use, the radial arm 7 can be rotated to change its angular position and, in consequence, to bring the reference signal generated by the device into phase with the low frequency signal from the output of the low frequency amplifier of the analytical circuit. The arm may be rotated until the phase-sensitive detector produces the maximum signal (as shown for example on either a direct current voltmeter or on a cathode ray oscillograph display) and then the set screw can be tightened to retain the arm in this position.

The technique of our invention can be adapted to analyse for more than one component in a multicomponent sample, as for example by the device represented in FIG. 4A which shows a possible way to analyse 3 components simultaneously. In this figure, 1, 2 and 3 are rotating shutters, the portions of which shown shaded are double-sided mirrors, geared together so that mirror 2 rotates at twice the frequency of the other two: 4 and 5 are stationary mirrors; 6, 7, 8 and 9 are filters selected to pass wavelengths corresponding to three absorption maxima (one for each of the three components being estimated) and to one common absorption minimum respectively; and 10 and 11 together represent source, sample cell, auxiliary filters and detector.

Figure 4B:
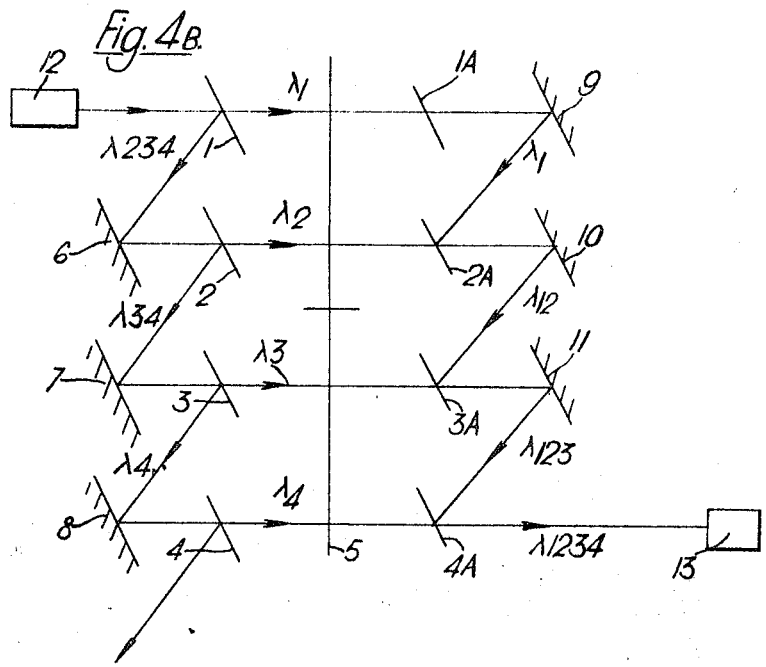
Figure 4C:
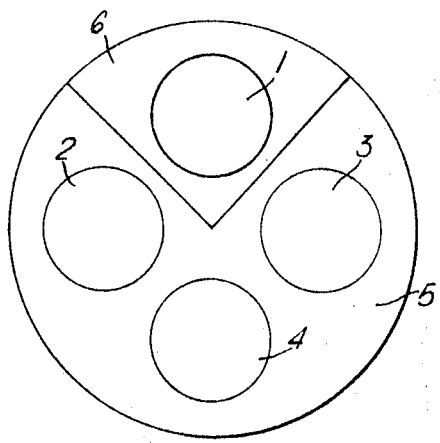

A further method of multicomponent analysis if shown in FIGURE 4B, in which a system of filters 1, 1A, 2, 2A, 3, 3A, 4, 4A and mirrors 6, 7, 8, 9, 10, 11 is used to isolate and recombine four bands, corresponding as in FIGURE 4A to three absorption maxima and one absorption minimum, in the manner of the device shown in FIGURE 2. These mirrors and filters are spacially arranged so that a single shutter device 5 can interrupt the four bands and feed them sequentially to a common detector 13. The chopper 5 can be a rotating disc cut to a shape which allows it to obscure in turn all the selected band paths, as shown in FIGURE 4C wherein the band paths are represented by circles 1, 2, 3, and 4, and 6 is a cut-out sector of disc 5.

It is preferable that at least that portion made up of the means for dividing, interrupting and recombining the beam is enclosed in a casing which excludes stray light (which may interfere with the measurements) and especially protects the optical surfaces from dirt.

For convenience of construction, the radiation source and sample cell can be made as one unit and the means for dividing, filtering, interrupting, recombining and dedecting the radiation can be made as a second unit. The shape of this second unit will be dictated by the components used, particularly the motor and the disc. The geometry of the two optical paths for the two wavelengths being measured can be varied by changing the angles at which the mirrors, filters, and discs are set, as can be seen from the drawings. In general, the arrangement shown in FIGURE 8 is the most compact. For multi-component analysis, the construction is made much easier if the beam of radiation emerging from the sample cell is split into beams of appropriate bands of wavelengths, and then each of these subsidiary beams is passed into a unit (referred to above as the "second unit") containing splitting, filtering and recombining facilities appropriate to the radiation wavelengths used for the analyses. The splitting of the main beam for this purpose can be achieved by known means, for example by an interference filter.

What we claim is:

1. A photometric absorption analyzer for analysis of at least one material by measuring the capacity of the material for absorbing radiation of a wavelength characteristic of the material, and wherein the analysis is obtained with a single absorption cell and thereby eliminates differences in measurements due to the use of a plurality of absorption cells, comprising a single radiation source for producing a beam of radiation, beam splitting means for producing separate beams from the radiation from the said single radiation source, means for directing the separate beams along separate optical paths, means for producing different, specific, selected wavelengths of radiation in the said separate beams relative to each other, the said means for producing the different wavelengths in each of the said beams being adjustable to provide a wavelength corresponding to an absorption maximum and a wavelength corresponding to an absorption minimum of the said material, means for alternately passing each of the said beams of different wavelengths along a common optical path, a single absorption cell disposed in said common optical path or in said radiation beam and a detector means at the end of the said common optical path for detecting and measuring the relative absorption of the said beams of different wavelengths by a sample contained in said absorption cell, whereby the output of the detector means is responsive to the absorption of the radiation due to the material to be analyzed and not to cell window fouling, and radiation source intensity.

2. Photometric analyser as claimed in claim 1 wherein the means for splitting of the beam of radiation produces two optical paths.

3. Photometric analyser as claimed in claim 2 wherein the splitting is achieved by a rotary shutter having a reflecting surface.

4. Photometric analyser as claimed in claim 3 wherein the beam of radiation is split and the two optical paths for the selected wavelengths are recombined by means of a rotary disc shutter having reflecting surfaces on both its sides, in association with stationary reflecting surfaces positioned so as to complete the two optical paths between aperture and reflecting surface for differing positions of the shutter.

5. Photometric analyser as claimed in claim 4 wherein the optical system includes means for focusing the radiation beam on the plane of the disc shutter.

6. Photometric analyser as claimed in claim 1 wherein the beam of radiation is split by means of an interference filter.

7. Photometric analyser as claimed in claim 6 wherein the two optical paths are recombined by means of an interference filter.

References Cited

UNITED STATES PATENTS

| | | | |
|---|---|---|---|
| 2,683,220 | 7/1954 | Gross | 250—233 |
| 2,797,256 | 6/1957 | Millspaugh | 250—226 |
| 2,849,912 | 9/1958 | Plesse et al. | 88—14 |
| 2,986,066 | 5/1961 | Rouy | 250—225 X |
| 3,335,286 | 8/1967 | Palmer et al. | 250—226 |

FOREIGN PATENTS 20,127　11/1934　Australia.

ROBERT SEGAL, Primary Examiner

U.S. Cl. X.R.

250—220, 233; 356—188